United States Patent [19]

Harris et al.

[11] Patent Number: 5,932,082
[45] Date of Patent: *Aug. 3, 1999

[54] ELECTROPLATING BATH FOR NICKEL-IRON ALLOYS AND METHOD

[75] Inventors: Thomas M. Harris; Jennifer Lyn Wilson, both of Tulsa, Okla.

[73] Assignee: The University of Tulsa, Tulsa, Okla.

[*] Notice: This patent is subject to a terminal disclaimer.

[21] Appl. No.: 08/918,017

[22] Filed: Aug. 25, 1997

Related U.S. Application Data

[63] Continuation of application No. 08/623,543, Mar. 29, 1996, Pat. No. 5,683,568.

[51] Int. Cl.$^6$ ........................................... C25D 3/12
[52] U.S. Cl. .......................... 205/259; 205/119; 106/1.27
[58] Field of Search .................................. 205/119, 259; 106/1.27

[56] References Cited

U.S. PATENT DOCUMENTS

| | | | |
|---|---|---|---|
| 3,045,334 | 7/1962 | Berzins | 29/194 |
| 3,706,635 | 12/1972 | Kowalski | 204/46 |
| 3,878,067 | 4/1975 | Tremmel | 204/43 |
| 3,974,044 | 8/1976 | Tremmel | 204/43 |
| 4,002,543 | 1/1977 | Clauss et al. | 204/41 |
| 4,102,756 | 7/1978 | Castellani et al. | 204/43 |
| 4,134,802 | 1/1979 | Herr | 204/43 |
| 4,179,343 | 12/1979 | Tremmel | 204/43 |
| 4,228,201 | 10/1980 | Feldstein | 427/92 |
| 4,239,587 | 12/1980 | Koel et al. | 156/659.1 |
| 4,371,861 | 2/1983 | Abdelrahman et al. | 338/25 |
| 4,421,611 | 12/1983 | Cameron | 204/43 |
| 4,434,030 | 2/1984 | Vitkova et al. | 204/43 |
| 4,450,051 | 5/1984 | Tremmel | 204/43 |
| 4,623,439 | 11/1986 | Mitsuoka et al. | 204/192.2 |
| 4,717,458 | 1/1988 | Martin et al. | 204/44.2 |
| 4,770,751 | 9/1988 | Kawagishi et al. | 204/30 |
| 4,770,788 | 9/1988 | Vignola | 210/670 |

(List continued on next page.)

OTHER PUBLICATIONS

Harris, Thomas M., Wilson, Jennifer L. (St. Clair), Bleakley, Matthew; *Effect of Ethylenediamine on the Electrodeposition of Ni–Fe Alloys*; Department of Chemistry, University of Tulsa; 1999, (no month available).

Srimathi, S.N. and Mayanna, S.M., *Nickel–Iron Alloy Plating In Pyrophosphate–Ethylenediamine Baths*, Plating and Surface Finishing, Dec., 1985, pp. 76–79.

Harris, Thomas M., Huynh, Tuyen and St. Clair, Jennifer, Abstract No. 333 *Anomalous Codeposition of Ni–Fe Alloys: Effect of Complexants*, Extended Abstracts, vol. 95–2, Fall Meeting, Chicago, Illinois, Oct. 8–13, 1995, p. 542.

Sree, Vasanta (Miss) and Char, T.L. Rama, *Electrodeposition of Nickel–Iron Alloys From the Pyrophosphate Bath*, Electrochemistry Laboratory, Department of Inorganic and Physical Chemistry, Indian Institute of Science, Bangalore, India. Metal Finishing, Aug., 1961, pp. 49–55.

CA 1995: 613440 no month available.

*Primary Examiner*—Kishor Mayekar
*Attorney, Agent, or Firm*—Head, Johnson & Kachigian

[57] ABSTRACT

An improved electroplating bath, complexing agent, product and method for producing nickel-rich nickel-iron alloys, such as Permalloy, having about 22% iron and 78% nickel. The improved electroplating bath contains a small amount of an organic amine complexing agent such as ethylenediamine or diethylenetriamine which increases the nickel/iron mass ratio of the deposit, causes nickel to be deposited in favor of iron, reduces the sensitivity of the deposit composition to the iron content of the bath and the applied current density. Further, the pH of the bath is adjusted to about 5.0 to stabilize the complexes and tartaric acid is added to complex ferric ion and thus prevent its precipitation. The organic amine complexing agents useful in accordance with the present invention are agents which complex with nickel and include ethylenediamine and diethylenetriamine each having at least two amine groups with each of the amine groups separated by two carbons.

10 Claims, 9 Drawing Sheets

U.S. PATENT DOCUMENTS

| | | | |
|---|---|---|---|
| 4,780,781 | 10/1988 | Sano et al. | 360/126 |
| 4,983,263 | 1/1991 | Yasuda et al. | 204/44.2 |
| 5,146,299 | 9/1992 | Lampe et al. | 357/23.5 |
| 5,178,745 | 1/1993 | Abys et al. | 205/219 |
| 5,194,140 | 3/1993 | Dobrovolskis et al. | 205/245 |
| 5,234,574 | 8/1993 | Tsuji et al. | 205/213 |
| 5,258,200 | 11/1993 | Mayernik | 427/8 |
| 5,302,464 | 4/1994 | Nomura et al. | 428/551 |
| 5,403,650 | 4/1995 | Baudrand et al. | 428/209 |
| 5,417,840 | 5/1995 | Block et al. | 205/246 |

ELECTROPLATING BATH FOR NICKEL-IRON ALLOYS AND METHOD

CROSS-REFERENCE TO RELATED APPLICATION

This application is a continuation of U.S. patent application Ser. No. 08/623,543 filed Mar. 29, 1996, now U.S. Pat. No. 5,683,568, issued Nov. 4, 1997.

GOVERNMENT RIGHTS

The National Science Foundation may have license rights in this invention pursuant to National Science Foundation Grant No. DMR-9404871.

BACKGROUND OF THE INVENTION

The present invention is directed to the electroplating of nickel-iron alloys, particularly the nickel-rich alloys employed as coatings for corrosion protection and as magnetic thin films in the head of a computer hard disk drive. The invention encompasses electroplating baths or solutions, the use of complexing agents in these baths, and the methods which employ these baths.

Nickel-iron (Ni-Fe) alloys exhibit a variety of useful properties. One particular alloy, known as Permalloy (78% Ni, 22% Fe), finds extensive use as a soft magnetic material in the head of a computer hard disk drive. The "thin film head" now dominates all other head designs. The Permalloy components of a thin film head are produced by an electrodeposition process reported in the open literature in 1962 by Honeywell scientists.

The addition of increasing amounts of nickel to a nickel-iron alloy produces a dramatic improvement in its corrosion resistance. Thus, electroplated nickel-iron alloys that are rich in nickel have been considered for use as decorative coatings on steel implements. The ability to produce such coatings in the "bright" condition, in which the deposit is smooth on a microscopic scale and thus does not require polishing after the deposition, makes this type of deposit desirable from an aesthetic as well as economic perspective.

Since the standard reduction potentials of nickel and iron are similar (−0.25 and −044, respectively), it might be imagined that the electrodeposition of this composition would be straightforward. However, compositional control is complicated by the phenomenon of anomalous codeposition (AC), in which the more active metal (iron) deposits preferentially to the more noble metal (nickel). In fact, in order to achieve a Ni/Fe mass ratio of 3.5 in the deposit (for Permalloy), a Ni/Fe ratio in excess of 40 is typically maintained in the bath.

The first explanation for the anomalous codeposition observed in the nickel-iron system was provided by Dahms and Croll in 1965 (1). Their data indicate that ferrous ion in the bath produces an increase in the deposition overpotential for nickel. It was recognized at the time that hydrogen ion is reduced at the cathode, and that this half-reaction produces an increase in the pH at the surface of the deposit. Thus, Dahms and Croll attributed the AC to the formation of an $Fe(OH)_2$ precipitate film on the deposit. Some years later Hessami and Tobias (2) suggested that the increase in cathode pH was only sufficient to produce the soluble iron hydrolysis product $FeOH^+$. A mathematical model of anomalous codeposition based on the adsorption of this species on the cathode successfully predicted Ni-Fe deposit compositions under certain sets of conditions. Shortly after the Hessami-Tobias model was published, Deligianni and Romankiw (3) experimentally verified that the increase in cathode pH was modest. Furthermore, it was noted that the pH increase was similar to that observed with ferric ion solutions, suggesting that ferric ion (present in the bath as the result of the air oxidation of ferrous ion) was controlling the cathode pH. Thus, they attributed anomalous codeposition in the nickel-iron system to the adsorption of the hydrolysis products of ferric ion.

In the current electrodeposition bath utilized in the commercial production of nickel-iron (Ni-Fe) thin films, the nickel and ferrous ions are weakly complexed by chloride and/or sulfate ions. Under these conditions, the iron deposits preferentially to the nickel, so much so that, in order to produce a deposit composition of 22% iron and 78% nickel (the Permalloy composition), the concentration of ferrous ion in the solution must be precisely maintained at a low concentration (e.g. 0.0050M). Precise maintenance of this ferrous ion concentration is made difficult by the consumption of iron in the deposition, and by its oxidation (to ferric ion), precipitation (as ferric hydroxide) and subsequent removal by filtration. The actual iron content achieved with such a bath is quite sensitive to the iron concentration in the bath. The deposit composition is also sensitive to the applied current density under these conditions (FIG. 3). With careful control of the bath chemistry and the current applied to the electroplating cell, the composition provided by this system can still vary by up to 10%.

From the discussion above it is clear that it would be desirable to possess an electroplating system capable of producing nickel-rich nickel-iron alloys that 1) allowed for higher concentrations of iron to be employed in the bath, 2) limited the sensitivity of the deposit composition to the concentration of iron in the bath, and 3) limited the sensitivity of the deposit composition to the applied current density. Thus, the patent record was searched for references to nickel-iron electroplating, and the use of complexing agents and/or compounds, in nickel-iron electroplating.

The patents discussed below point out that two very different attitudes exist with respect to the electroplating of nickel-iron alloys. For the production of thin films for magnetic applications, the electroplating bath tends to be as simple as possible, and the morphology (roughness) of the deposit, while important, is secondary to the composition. For the thicker deposits used to protect a steel substrate from corrosion, freedom from pinholes and the surface morphology (roughness) of the deposit are most important.

In the electrodeposition of magnetic thin films, control of the bath chemistry is of paramount importance. Additives are viewed with trepidation, unless their action is absolutely essential and their electrochemical behavior is reasonably well understood. Boric acid (which limits the inclusion of hydroxides in the deposit), saccharin (which reduces tensile stresses in the deposit) and a wetting agent such as sodium lauryl sulfate (which assists in the detachment of hydrogen gas bubbles from the deposit) are considered essential. Castellani, Powers and Romankiw (U.S. Pat. No. 4,102,756) state that "complexing agents are to be avoided," but nonetheless note that citrate, tartrate, oxalate and phosphate may be used. Since all of these complexing agents are known to form stable complexes with ferric ion, it is clear that the primary effect of their addition would be to limit the precipitation of ferric hydroxide.

Two other patents, U.S. Pat. Nos. 4,239,587 and 4,780,781, relate to the electrolytic production of magnetic thin films. In U.S. Pat. No. 4,239,587 the use of a bath to produce a relatively high iron content in the deposit is described. The purpose of the higher iron content is to enhance the ability to etch the material during further processing of the head. The bath used in producing these deposits is prepared with iron (II) ammonium sulfate. As seen below, the ammonium ion present in this bath has little or no effect on the deposit composition.

In U.S. Pat. No. 4,780,781 the deposition of Co/Ni/Fe thin films for micro-magnetic applications is described. One of the baths in this invention contains a very small amount (0.1 g/L) of dimethylamine-borane. While not stated explicitly, it would appear that the purpose of this additive is the introduction of a small amount of boron into the deposit. In U.S. Pat. Nos. 4,228,201 and 5,403,650, dimethylamine-borane is listed as a reducing agent in the "electroless" deposition of nickel (this process is explained in detail below). In these two cases it is clear that dimethylamine-borane is not behaving as a complexing agent.

For the electroplating of nickel-iron coatings for decoration and/or corrosion protection, the shininess (absence of roughness) of the deposit is of primary importance. When produced from "simple" baths, nickel-iron alloy deposits are gray colored as the result of a surface that is rough on a microscopic scale. To overcome this undesirable appearance, organic additives known as "brighteners" are added to the bath. These compounds act by adsorbing onto the surface, inhibiting the growth of existing crystallites, and therefore enhancing the rate of nucleation of new crystallites. The resultant deposit is fine grained and microscopically smooth, or bright.

U.S. Pat. Nos. 5,194,140, 4,434,030, 4,450,051, 4,179,343, 3,974,044, 4,134,802, 4,002,543, 3,878,067, and 4,421,611 describe a compound or mixture of compounds that promote the brightness (and/or limit the porosity) of a nickel-iron coating. The chemistry of these baths is quite complex. Ethylenediamine (EDA) is mentioned in some of these patents, but it is typically reacted with other compounds (to yield higher molecular weight species that serve as a "brightener") prior to its addition to the bath. It would appear that such additives do not affect the Ni/Fe mass ratio of the deposit by enhancing the rate of nickel deposition, because it is recommended in the patents that the baths contain 10–40 times more nickel than iron (II) ions.

U.S. Pat. Nos. 5,194,140 and 5,417,840 indicate that EDA, as well as higher molecular weight polyamines and hydroxylated polyamines, may be used as complexing agents in the electroplating of zinc-cobalt and zinc-nickel alloys (both of which also serve as coatings for corrosion protection). The baths from which these alloys are produced are alkaline; if the metal ions are not complexed, they will precipitate as hydroxides. Thus, the presence of these complexing agents is necessary to maintain the metals in solution.

U.S. Pat. Nos. 3,045,334 and 5,403,650 relate to the "electroless" or chemical deposition of nickel. In these systems, reduction of nickel ion to nickel metal is caused not by the application of a current, but by reaction with a reducing agent present in the bath. To control the rate of this redox reaction (and to have it occur only on surfaces that are catalytic for it), the nickel in the bath must be in the complexed form. Thus, complexing agents are an important component of any electroless plating bath (see also U.S. Pat. No. 5,258,200). EDA and diethylenetriamine (DETA) are both listed as complexing agents for use in electroless nickel baths. The action of EDA in this capacity was examined by A. Vaskelis et al. in 1986, as reported in Surface and Coatings Technology (4). They note that EDA reduces the decrease in pH that occurs at the deposition surface during the course of the deposition, and as a result increases the rate of metal build-up on the surface. However, in this process only nickel is being deposited.

The use of the organic amine 1,2-diaminopropane in a bath for the electroplating of palladium to provide a corrosion-resistant coating for interconnects is described in U.S. Pat. No. 5,178,745. The bath is referred to as a strike bath, meaning that it is suitable for electroplating on metals more "active" than palladium. Immersion of such a metal in a solution containing palladium will result in a deposit even without the application of a current; the palladium and the substrate metal undergo what is known as a "displacement" reaction. Such displacement deposits do not have the physical integrity required for deposits used in magnetic thin film or corrosion protection applications. The organic amine in this bath serves to shift the deposition potential to more negative values, so that displacement becomes impossible.

Hence, there exists a need for an improved electroplating bath for producing nickel-iron (Ni-Fe) thin films, alloys, products, and methods.

SUMMARY OF THE INVENTION

In accordance with the present invention, an improved bath for the electroplating of nickel-iron (Ni-Fe) alloys provides for greater control of the deposit composition, through greater control of the bath chemistry. To achieve this end, the bath is modified by the addition of a nickel complexing or sequestering agent, for example, an organic amine such as ethylenediamine (EDA). The effect of the addition of EDA to a typical nickel-iron electroplating bath can be seen in FIG. 1. The Ni/Fe mass ratio of the deposit is observed to increase by a factor of four as the concentration of EDA is increased from 0 to 0.60 moles/liter (M). Most of the Ni/Fe mass ratio increase occurs with the addition of as little as 0.10M EDA.

In accordance with the present invention, the effect of complexants in a nickel-iron electrodeposition bath on the composition of the deposits was examined. The addition of tartaric acid, which primarily complexes ferric ion and thus prevents its hydrolysis, produced a decrease in the Ni/Fe mass ratio of the deposit (FIG. 2). The addition of ethylenediamine (EDA) to the bath produced a significant increase in the Ni/Fe mass ratio. This complexant forms very stable complexes with nickel ion, while having little effect on the hydrolysis of iron. Based on these observations, it can be concluded that the chemical state of the nickel ion, not the adsorption of an iron hydrolysis product on the surface of the deposit (1, 2, 3), controls the relative deposition rates of nickel and iron in Permalloy electrodeposition.

In accordance with one embodiment of the present invention, an improved electroplating bath containing ethylenediamine may be used in the production of nickel-iron alloys for magnetic devices, such as the head of a computer hard disk drive. One key to the superior performance of this bath is ethylenediamine, which forms a soluble coordination complex with nickel ions in the bath and thus changes the mechanism by which it deposits. This change in turn provides a significant improvement in the ability to control the composition of the alloy, an important issue with respect to its performance in magnetic devices. This improved electroplating bath is a substitute for the conventional bath utilized in the electroplating of nickel-iron layers in the head of a computer hard disk drive.

The principal object of the present invention is the provision of an improved electroplating bath for producing nickel-iron alloys.

Another object of the present invention is the provision of a method for producing nickel-iron alloys utilizing an improved electroplating bath.

A still further object of the present invention is the provision of a nickel complexing agent for an improved Ni-Fe thin film electroplating bath and method.

Yet another object of the present invention is the provision of a nickel-iron thin film produced by the improved electroplating bath and method.

Another more particular object of the present invention is the provision of an improved electroplating bath for producing nickel-iron thin films that serve as the magnetic element in a computer hard disk drive head.

Other objects and further scope of the applicability of the present invention will become apparent from the detailed description to follow, taken in conjunction with the accompanying drawings.

DETAILED DESCRIPTION OF THE PREFERRED EMBODIMENTS

As noted above, there is a need for an improved electroplating system capable of producing nickel-rich nickel-iron alloy deposits. Typical conventional technology utilizes a bath with a very low concentration of iron, and the deposit composition is quite sensitive to both the iron concentration in the bath as well as the current density applied to the electrolytic cell.

The effect of adding various complexing agents to the conventional nickel-iron electroplating bath has been examined. In the course of this study two complexing agents have been identified that promote the desired changes in the nickel-iron electroplating system. Other complexing agents were found to produce no change in the deposit composition, or produce a change in a direction opposite to that desired. The overall pattern of behavior that emerges from this study suggests that the key to an improved system is a complexing agent that contains multiple amine functional groups, separated along the molecule by ethylene groups ($-CH_2CH_2-$), which allow the utilization of each amine group in the complexation of the nickel ions in solution. At the same time, the presence of one or more carboxylate functional groups on the complexing agent molecule, which allows for the complexation of iron as well as nickel, appears to render the complexing agent incapable of affecting the desired change in the deposition.

EXPERIMENTAL METHODOLOGY

With respect to FIGS. 1–5 of the drawings, all electrodeposition baths were prepared with reagent-grade chemicals and high purity water (HPW) produced with a Millipore Milli-Q water purification system. The "baseline" or conventional Ni-Fe electrodeposition bath contained 0.20 moles/liter (M) $NiCl_2$, 0.0050M $FeCl_2$, 0.70M NaCl, and 0.20M $H_3BO_3$. The pH was adjusted with concentrated HCl or a 50% NaOH solution. The pH was adjusted to 5.0 in all baths containing complexing agents.

Figure 1:
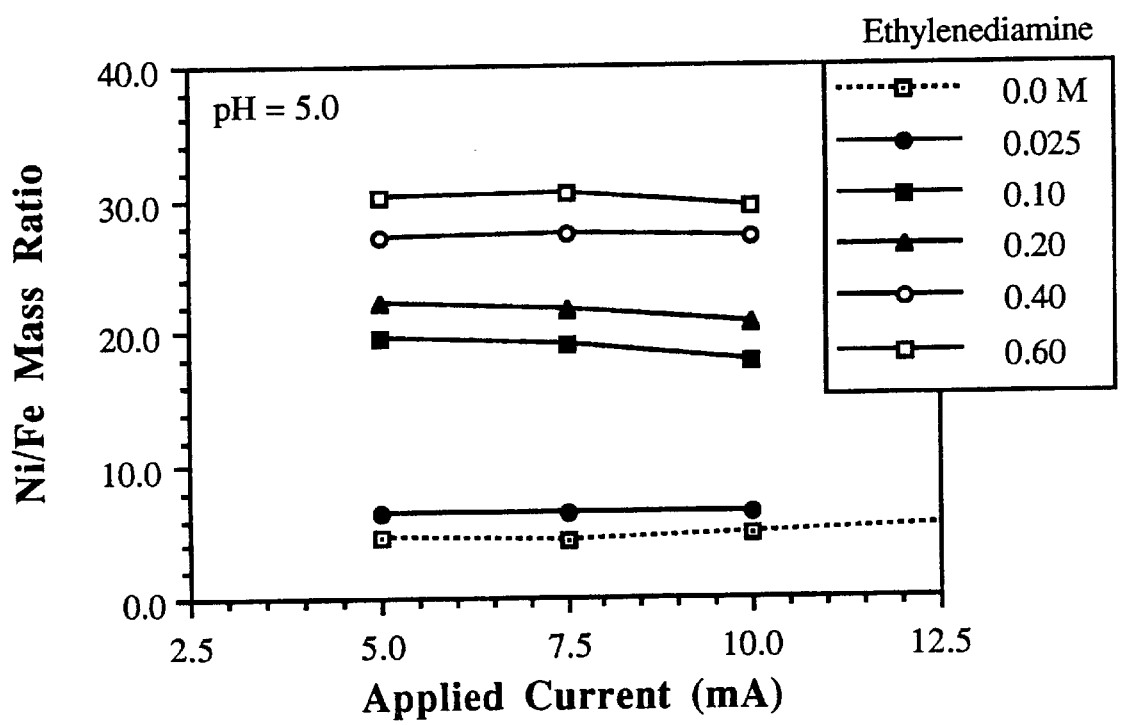
FIG. 1 is a graphical illustration of the effect of ethylenediamine concentration on the deposit composition.
Figure 2:
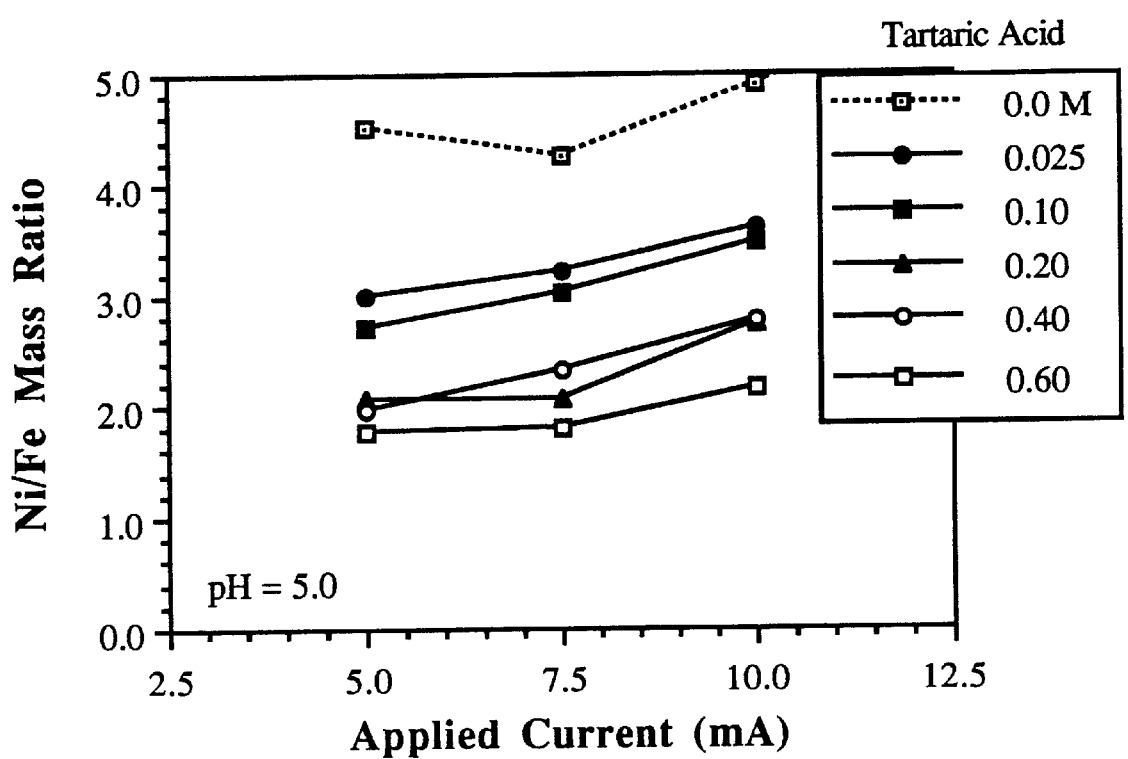
FIG. 2 is a graphical illustration of the effect of tartaric acid concentration on deposit composition.
Figure 3:
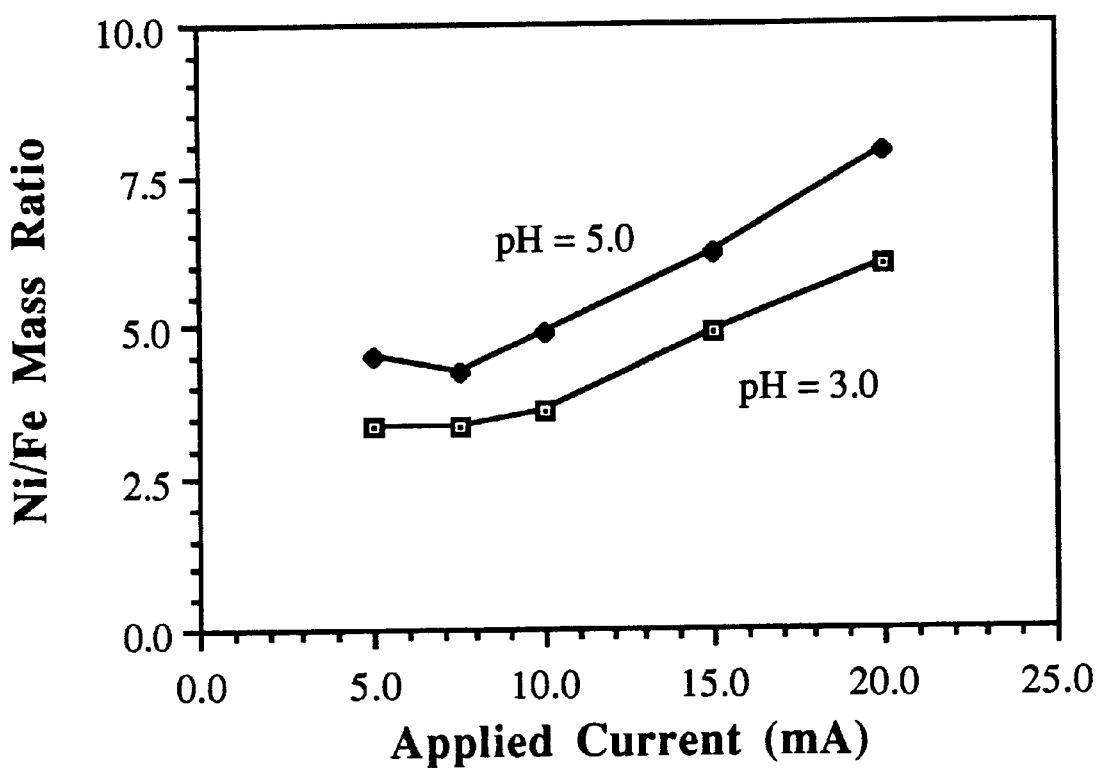
FIG. 3 is a graphical illustration of the effect of pH on the composition of deposits from the "base line bath"
Figure 4:
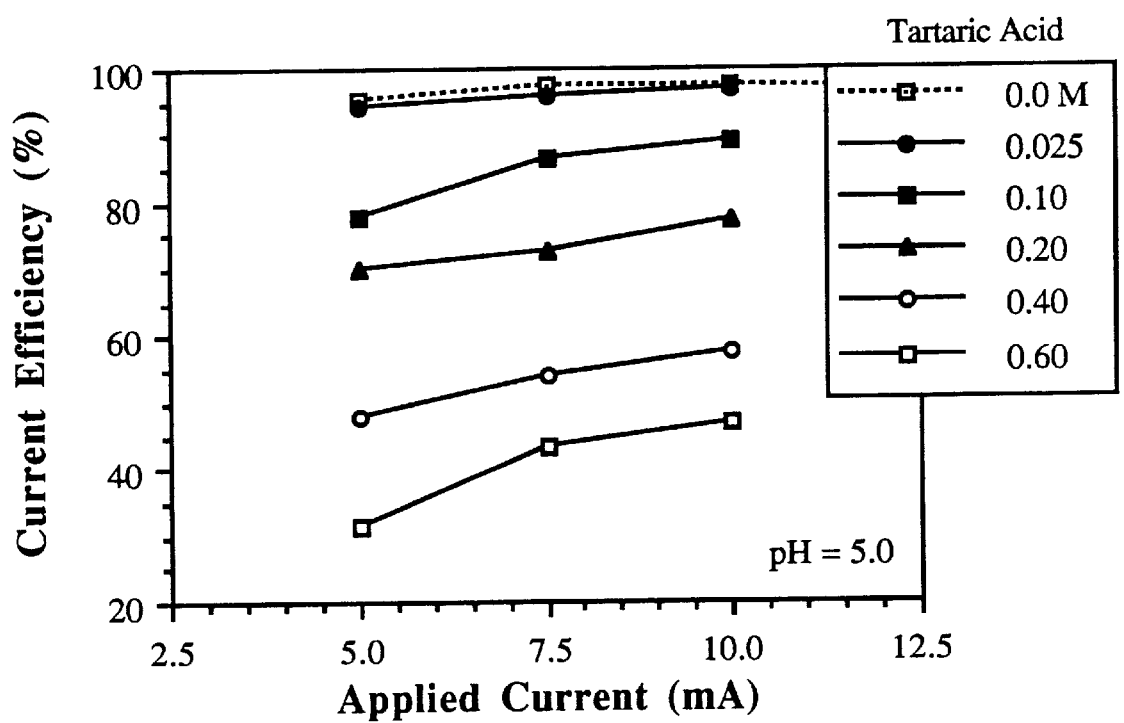
FIG. 4 is a graphical representation of the effect of tartaric acid concentration on the current efficiency of deposition.
Figure 5:
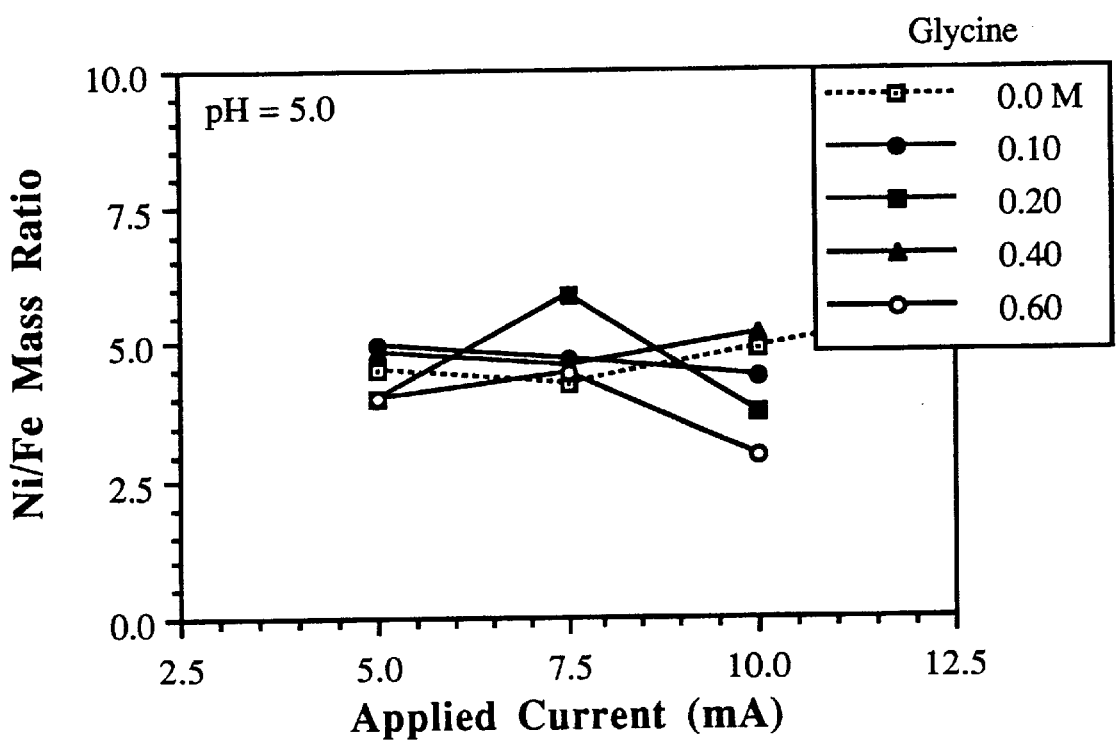
FIG. 5 is a graphical representation of the effect of glycine concentration on the deposit composition.

FIG. 1 shows the effect of ethylenediamine concentration on the composition of deposits produced from a conventional Ni-Fe electroplating bath (pH=5). FIG. 2 illustrates the effect of tartaric acid concentration on deposit composition. FIG. 3 represents the effect of pH on the composition of deposits produced from a conventional Ni-Fe electroplating bath. FIG. 4 depicts the effect of tartaric acid concentration on the current efficiency of deposition. FIG. 5 shows the effect of glycine concentration on the deposit composition.

Deposition experiments were conducted on a rotating disk cathode consisting of electrical-grade copper. The surface of the substrate was prepared by mechanical polishing, to a final finish produced with 1 $\mu$m alumina powder. The cathode was rotated at 300 rpm with a Pine Instruments ASR 2 rotator.

Depositions were conducted in a water-jacketed cell that allowed the temperature to be controlled at 35° C. To limit air oxidation of ferrous ion in the bath, nitrogen gas was continuously bubbled through the bath during the depositions. A combination glass pH electrode was used to monitor the bulk pH of the bath during the depositions; it did not change significantly during any of the depositions.

The depositions were controlled by a Princeton Applied Research Model 270 potentiostat, and a Compaq Presario computer running PAR Model 250 software. The galvanostatic mode was utilized in each experiment. A total of 16 C was passed in each deposition; thus, the deposition time varied inversely with the current applied to the cell. A platinum wire anode was isolated from the main portion of the bath by fritted glass. The deposition potential was monitored continuously with a saturated calomel electrode positioned within close proximity to the cathode.

The composition of the deposits was determined by atomic absorption spectrophotometry, preceded by dissolution in aqua regia. Although some copper from the substrate also dissolved in the acid, it did not interfere with quantitation of the nickel or iron.

RESULTS AND DISCUSSION

The commercial electrodeposition of Permalloy typically takes place from an acidic bath (e.g. pH=3). A pH of 5.0 was used in this study to enhance the stability of any complexes that might form. When the pH of the baseline bath was adjusted to this value, the Ni/Fe mass ratio increased at all applied current values (FIG. 3).

The current efficiency (CE) was also higher with the bath adjusted to pH 5.0. At pH 5.0 the CE exceeded 95% in all cases, while in the bath adjusted to pH 3.0 the CE ranged from 85–95%. While the pH at the cathode surface was not measured directly in this study, a high current efficiency is likely to correlate with a relatively high cathode pH. Thus, it would appear that the cathode pH in the bath with the bulk pH of 5.0 is significantly higher than this value.

The addition of tartaric acid to the baseline bath enhanced the anomalous character of the deposition. The Ni/Fe mass ratio decreased steadily with increasing tartaric acid concentration (FIG. 2), with the largest relative decrease occurring from 0 to 0.025M. Tartaric acid is known to form stable complexes with ferric ion (Table I). As a result, hydrolysis of ferric ion is prevented; in fact, the haziness typically observed in the baseline bath after some period of usage was not observed with tartaric acid present.

The addition of tartaric acid to the bath reduced the current efficiency significantly (FIG. 4). Tartaric acid exhibits pK values of 3.0 and 4.4; thus, at the pH to which the bath was adjusted (5.0), tartaric acid (or rather, monohydrogen tartrate) is capable of serving as a reservoir of hydrogen ion. The ready reduction of hydrogen ion in these baths suggests that the pH at the surface of the cathode increases little during deposition.

The addition of glycine to the bath had little effect on the Ni/Fe ratio of the deposits (FIG. 5). As can be seen in Table I, glycine forms reasonably stable complexes with both ferric ion and ferrous ion (as well as nickel ion). However, with glycine present the bath still developed haziness after an extended period of usage, indicating that at least ferric ion was undergoing hydrolysis. Since nickel ion also forms stable complexes with glycine, it is likely that the incomplete complexation of iron is simply due to competition on the part of nickel ion for the complexant.

The addition of glycine resulted in an increase in the current efficiency. The increase in current efficiency indicates that glycine does not buffer the pH at the cathode surface. Since $pK_1$ for glycine is 2.4 and the $pK_2$ is 9.8, buffering at pH 5.0 (the bulk pH of the bath) would not be expected. Thus, it is likely that the pH at the cathode rises well above 5.0 in this system.

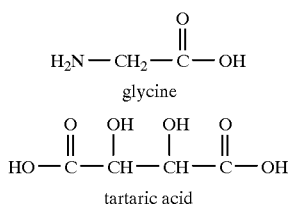

The addition of ethylenediamine (EDA) to the bath nearly eliminated the anomalous character of the deposition (FIG. 1). It should be noted that the Ni/Fe mass ratio of the bath was 41.9, a value slightly above the upper boundary of the figure. The Ni/Fe ratio increased with each increase in the ethylenediamine concentration, with the largest relative increase occurring from 0.025 to 0.10M EDA.

The complexation of ferric ion by ethylenediamine has not been reported in the literature, judging from the haziness that developed in the bath shortly after it was prepared, this complexant does not prevent ferric ion hydrolysis. This complexant (EDA) does react strongly with nickel ion, but much less strongly with ferrous ion (Table I).

The current efficiency decreased only slightly upon the addition of ethylenediamine (>87%). The most significant decrease was observed as the concentration of ethylenediamine was increased from 0.40 to 0.60M. The first pK of ethylenediamine (i.e. the conjugate diprotic acid) is 6.8; thus, the cathode pH should be increasingly buffered as it increases toward this value.

The steady-state deposition potential shifted cathodically by only 50 mV as the ethylenediamine concentration was increased to 0.60M. Since the stability of the $Ni^{2+}$ ethylenediamine complexes is quite high (Table I), it is perhaps surprising that the magnitude of this shift was not greater. Coupled with the relative increase in the nickel content of the deposits, this result suggests that ethylenediamine in the bath must substantially reduce the activation overpotential for nickel deposition.

From the preliminary experiments involving tartaric acid, glycine and ethylenediamine, it was clear that the key to producing the desired change in the Ni/Fe ratio of the deposit is the presence of an organic amine complexing agent such as ethylenediamine. Ethylenediamine, 1,2-diaminoethane, $C_2H_8N_2$, $H_2NCH_2CH_2NH_2$, or 1,2-ethanediamine, contains two primary amine functional groups. In acidic solutions (pH<7), both of the amine functional groups will be protonated. Thus, in a Ni-Fe plating bath adjusted to pH=5, the ethylenediamine is actually in the form referred to as the ethylenediammmonium ion.

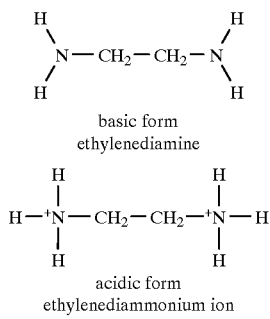

Ethylenediamine interacts with the nickel ions in solution through the formation of "coordination compounds" in which bonds are formed between the metal ion and the nitrogens of the ethylenediamine. Such "complexation reactions" occur in a step-wise manner.

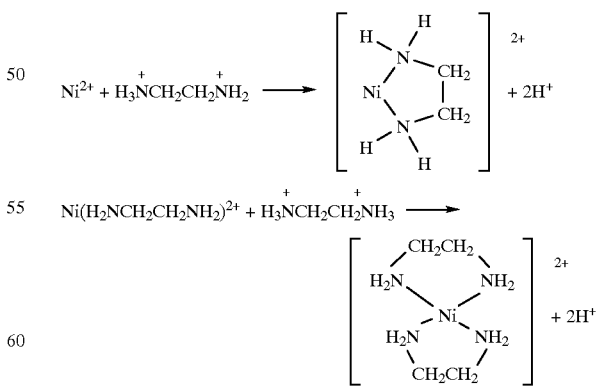

In this context, it is likely that other amine compounds might produce similar behavior in the Ni-Fe plating bath.

For example, diethylenetriamine (DETA) performs as well if not better than ethylenediamine. The expanded molecular structure of this compound is presented below. The nickel ion will be fully coordinated by only two DETA molecules, which should presumably result in the need for a lower concentration of the complexant. Interestingly, the following two compounds in the polyethyleneamine series, triethylenetetraamine and tetraethylenepentamine, were found to provide little change in the deposit composition.

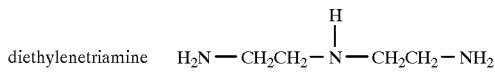

diethylenetriamine    $H_2N-CH_2CH_2-\overset{\underset{\displaystyle |}{H}}{N}-CH_2CH_2-NH_2$ Other EDA analogs failed to provide any enhancement in the Ni/Fe mass ratio under the conditions examined (analog concentrations of 0.10 and 0.40M, and pH adjusted to 5). The "inactive analogs" include ammonium chloride and ethylamine; thus, it would appear that it is important for the additive to possess more than one amine group that can interact with the nickel ions in solution. The compound 1,3-diaminopropane was also inactive; thus, apparently it is important that the number of carbons separating the amine groups does not exceed two (as in the case of EDA, otherwise known as 1,2-diaminoethane).

Figure 6:
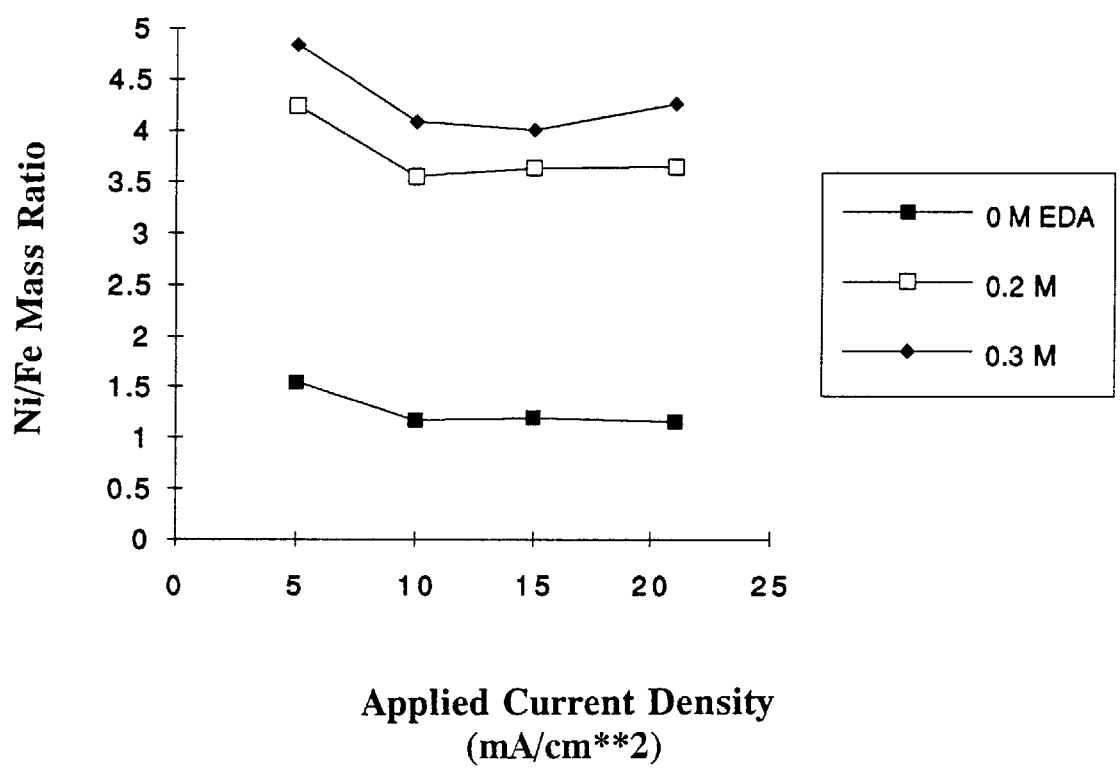
FIG. 6 is a graphical representation of the effect of ethylenediamine concentration on the composition of deposits produced from a bath containing 0.025M iron (II) and adjusted to pH 5.
Figure 7:
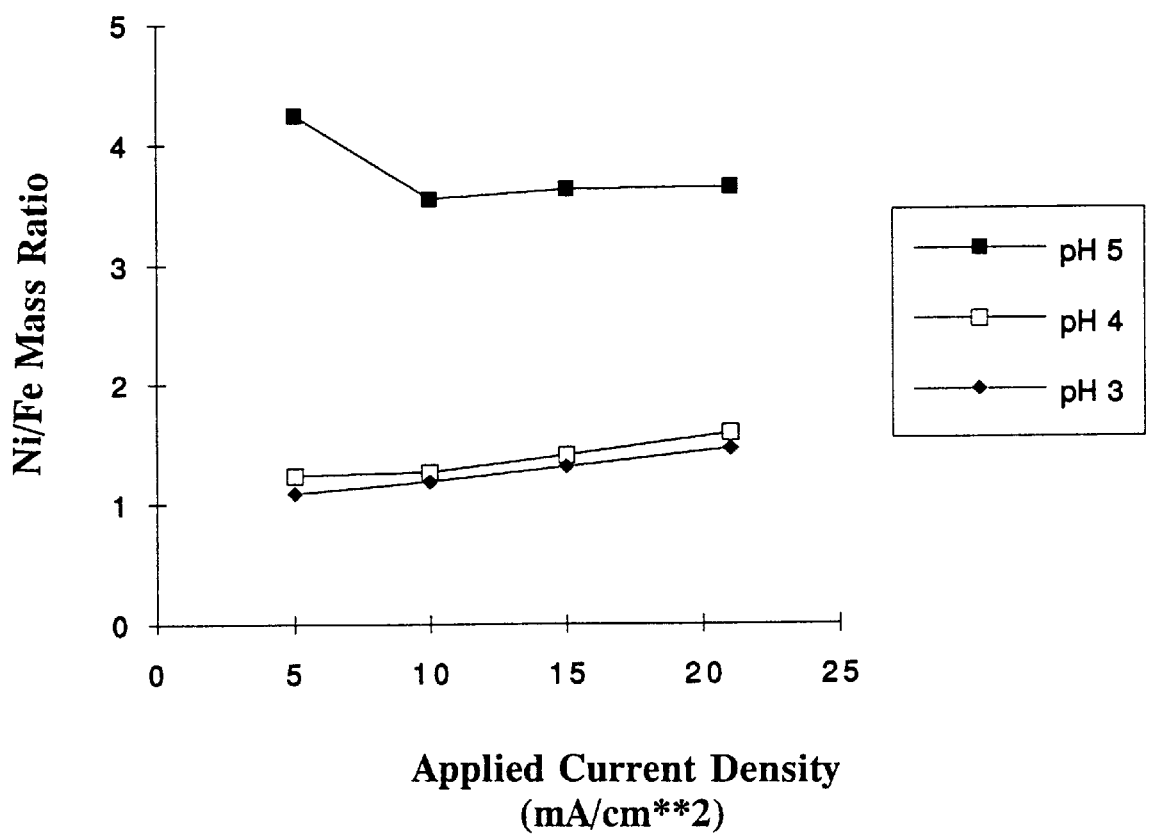
FIG. 7 is a graphical illustration of the effect of pH on the composition of deposits produced from a bath containing 0.025M iron (II) and 0.10M ethylenediamine, and adjusted to pH 5.
Figure 8:
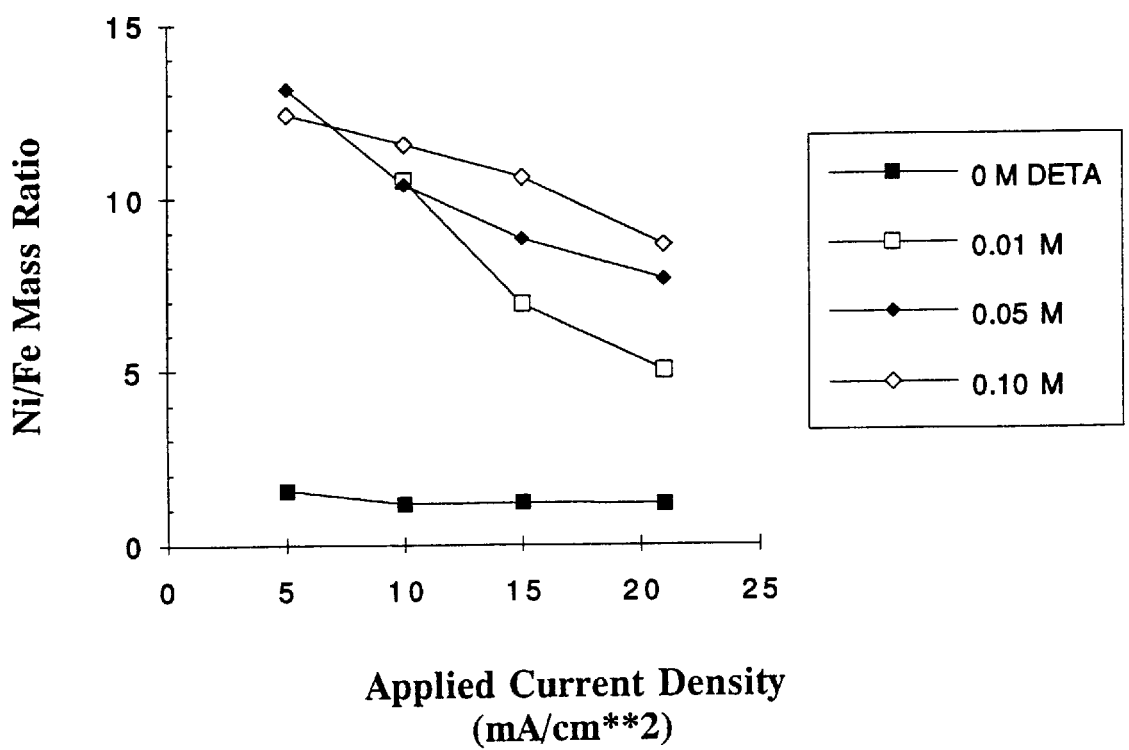
FIG. 8 is a graphical representation of the effect of diethylenetriamine concentration on the composition of deposits produced from a bath containing 0.025M iron (II) and adjusted to pH 5; and, FIG. 9 is a graphical illustration of the effect of pH on the composition of deposits produced from a bath containing 0.025M iron (II) and 0.10M diethylenetriamine, and adjusted to pH 5.
Figure 9:
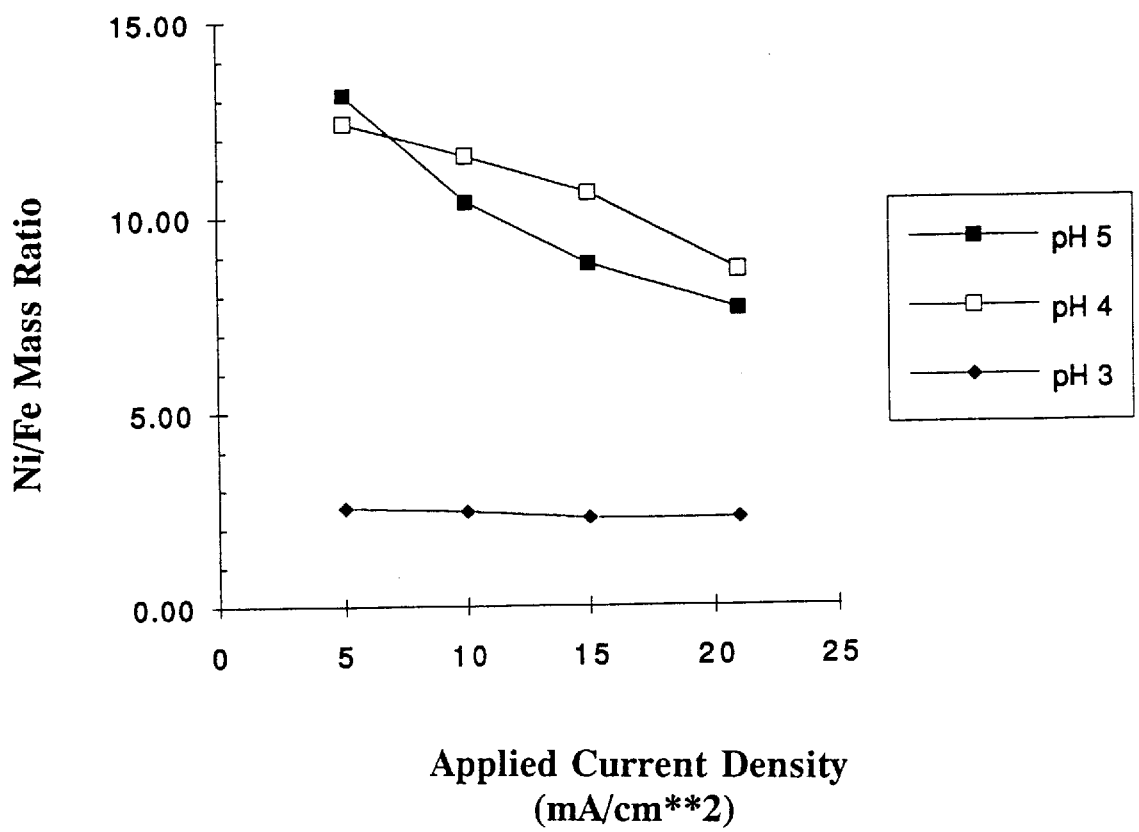

FIG. 6 illustrates the effect of ethylenediamine concentration on the composition of deposits produced from a bath containing 0.025M iron (II) and adjusted to pH 5. FIG. 7 represents the effect of pH on the composition of deposits produced from a bath containing 0.025M iron (II) and 0.10M ethylenediamine, and adjusted to pH 5. FIG. 8 depicts the effect of diethylenetriamine concentration on the composition of deposits produced from a bath containing 0.025M iron (II) and adjusted to pH 5. FIG. 9 shows the effect of pH on the composition of deposits produced from a bath containing 0.025M iron (II) and 0.10M diethylenetriamine, and adjusted to pH 5.

The EDA in the bath enhances the rate of nickel deposition relative to that of iron. This effect allows higher concentrations of iron (II) to be used in the bath while still obtaining a deposit iron content near 22%. The benchmark Ni/Fe mass ratio value of 3.5 can be achieved with a bath containing 0.20 moles/liter nickel, 0.025 moles/liter (M) iron (II) and 0.20M EDA (FIG. 6). The higher concentration of iron (II) in this bath, which is allowed by the action of the EDA, results in much less variation in the deposit composition over the applied current density range of interest. Thus, through its ability to allow higher concentrations of iron (II) in the bath, EDA not only simplifies the maintenance of the bath but also reduces the sensitivity of the deposit composition to the applied current density.

The pH utilized in baths containing EDA is significantly higher than that utilized presently in commercial nickel-iron electroplating. A pH of 5 was chosen for the initial experiments because the stabilities of the nickel-EDA coordination complexes increase with increasing pH. As can be seen in FIG. 7, a pH of about 5 is indeed necessary for EDA to have the desired effect on the deposit composition. Unfortunately, higher pH values also promote the oxidation of iron (II) to iron (III), which in turn increases the rate of iron precipitation. Precipitation of ferric hydroxide can be prevented through the addition of a small amount of tartrate ion to the bath. Tests performed with a bath containing 0.20M nickel, 0.025M iron (II), 0.10M EDA and 0.025M tartrate ion, and adjusted to pH 5, provided deposit compositions essentially identical to those obtained from a bath without the tartrate ion, while at the same time preventing the formation of ferric hydroxide solid in the bath.

As little as 0.010M diethylenetriamine (DETA) can produce a nine-fold increase in the Ni/Fe mass ratio at low applied current densities (FIG. 8). However, at such low concentrations the deposit composition is quite sensitive to the applied current density. This sensitivity diminished as the DETA concentration was increased to 0.10M. As with the bath containing EDA, the pH must be elevated to realize the change in the deposit composition (FIG. 9). With 0.20M nickel, 0.025M iron (II) and 0.10M DETA, the Ni/Fe mass ratio decreased precipitously as the pH was reduced from 4 to 3.

The present invention is directed to an improved bath for the electroplating of nickel-iron alloys. Relative to conventional nickel-iron plating baths, this bath is modified with an organic amine complexing agent. The presence of this amine stimulates the deposition of nickel relative to iron. This behavior allows nickel-rich deposits (e.g., Permalloy with approximately 22% iron) to be produced from baths containing at least five times the conventional amount of iron (II), which will greatly simplify the maintenance of the bath. Furthermore, the composition of deposits produced with the modified bath are less sensitive to the absolute iron (II) concentration in the bath, and to the applied current density. At least two different organic amines, ethylenediamine and diethylenetriamine, may be used to modify the bath; the concentration used need not exceed 0.10 moles/liter. The pH of the bath should be maintained at or near 5 in order for these compounds to affect the deposit composition in the desired manner.

An appropriate range for each of the improved bath operating parameters is as follows: the nickel-to-ferrous ion ratio in the bath is about 1 to 50, preferably about 2 to 10, the pH of the bath is about 2.5 to 7, preferably about 4 to 6, the concentration of ethylenediamine in the bath is about 0.0050 moles/L to 10.0 moles/L, preferably about 0.050 moles/L to 0.60 moles/L, the concentration of diethylenetriamine is about 0.0050 moles/L to 10.0 moles/L, preferably about 0.010 moles/L to 0.10 moles/L, and the current density applied to the electroplating cell is about 3 MA/cm$^2$ to 50 MA/cm$^2$.

Our experiments with tartrate ion show clearly that its presence does not increase the Ni/Fe mass ratio of the deposit. Also it is clear from our experimental results that the presence of ammonium ion does not affect the Ni/Fe mass ratio.

In the present invention, the bath chemistry is modified by the addition of a nickel complexing agent such as EDA or DETA in order to provide greater control over the Ni/Pe ratio in the deposit. In our experiments the potential measured during the electroplating of nickel-iron alloys changes very little upon the addition of EDA or DETA to the bath.

In accordance with the present invention, an organic amine is added to a nickel-iron electroplating bath for the purpose of affecting the Ni/Fe mass ratio in the deposit (and ultimately providing greater control over the deposit composition). Prior patents that deal with the electrodeposition of magnetic thin films mention the use of complexing agents only in the limitation of iron precipitation. The bath compositions detailed in the prior patents indicate that iron deposition is still heavily favored over nickel deposition. The same observation can be made regarding the patents for the electroplating of "bright" nickel-iron coatings, despite the fact that the additives responsible for the brightening are polyamines, or are synthesized from EDA. EDA and other organic amine compounds are used in baths for the electroplating of zinc-based alloys (e.g. Zn-Ni and Zn-Co); however, their use in connection with zinc-based alloys is to prevent the precipitation of the zinc and other metal ions as a result of the high alkalinity of the baths. There is no indication that the complexing agent affects the alloy composition in these cases; in fact, our own experiments indicate that EDA does not affect the composition of nickel-zinc alloys electroplated from a pH 5 bath. Organic amine complexing agents are also employed in the electroless deposition of nickel, to reduce the reactivity of the nickel ions in the bath toward the reducing agent. These systems are radically different from the present invention. The same may be said for palladium strike baths, which employ organic amines to shift the deposition potential.

The improved electrodeposition bath, complexing agents, products and method of the present invention provide for the production of nickel-iron thin films, and products such as computer hard disk drive heads which incorporate such thin films, at reduced cost since the iron content of the deposit can be maintained very close to 22% by weight without the necessity of maintaining the iron (II) ions at a particular low level. A higher concentration of iron in the bath is allowed, the sensitivity to applied current density is reduced, and the like. Hence, the high production cost for nickel-iron thin films inherent in typical conventional technology is greatly reduced by incorporating the present invention which changes the bath so as to favor the deposition of nickel, reduce the sensitivity of the deposit composition to iron concentration of the bath, and to the applied current density.

The nickel-iron thin films of the present invention, for example, 400 Å to 50,000 Å thick, may also be incorporated into other magnetic devices, magnetic heads, magnetic probes, bubble devices, temperature sensors, corrosion resistant materials, magnets, bonded magnets, semiconductors, as well as other nickel alloy applications.

EXAMPLE 1

A conventional method of manufacturing a thin-film magnetic head is as follows. A polished silicon substrate of semiconductor quality having a cross-section of approximately 4 centimeters and a thickness of about 250 $\mu$m is thermally oxidized to produce a 5000 Å thick passivating silicon oxide layer on the substrate. A 50 Å thick $TiO_2$ layer is sputtered on the silicon oxide layer. A layer of nickel-iron thin film is deposited over the $TiO_2$ layer by electroplating. The substrate is dipped in an electroplating bath containing per liter:
130 g $NiSO_4 \cdot 6H_2O$
28.3 g $Fe(NH_4)_2(SO_4)_2 \cdot 6H_2O$
40 g $H_3BO_3$
30 g saccharin.

The electrodeposition process is carried out at a temperature slightly above room temperature and with a current density of 50 mA/sq.cm, which provides a rate of deposition of approximately 1 $\mu$m per minute. The nickel-iron thin film has about 21.1% by weight Fe and 78.9% by weight Ni.

A layer of photolacquer is provided in a pattern which corresponds to the pattern desired in the nickel-iron layer which is then etched in a suitable etching bath, for example, an aqueous solution of sulphuric acid, hydrogen fluoride and hydrogen peroxide. After etching, the layer of photolacquer is removed with acetone.

EXAMPLE 2

In accordance with the present invention, the manufacturing process of Example 1 is modified by adding 0.76 g ethylenediamine (EDA) to the bath.

EXAMPLE 3

In accordance with the present invention, the manufacturing process of Example 2 is modified to include the addition of 0.025 moles/liter tartrate ion.

EXAMPLE 4

An improved electroplating bath in accordance with the present invention includes 0.20 moles/liter nickel, 0.025 moles/liter iron (II) and 0.20 moles per liter ethylenediamine.

EXAMPLE 5

The electroplating bath of Example 4 further containing 0.025 moles per liter tartrate ion.

EXAMPLE 6

An improved electroplating bath for producing nickel-iron thin films contains about 0.20 moles/per liter nickel, 0.10 moles/liter iron (II) and 0.10 moles/liter diethylenetriamine.

EXAMPLE 7

The electroplating bath of Example 6 further containing 0.025 moles/liter tartrate ion.

EXAMPLE 8

The electroplating bath of Examples 4 or 6 further containing 0.40 moles/liter boric acid, 0.0010 moles/liter saccharin, and 0.0010 moles/liter sodium lauryl sulfate.

EXAMPLE 9

The electroplating bath of Examples 4 or 6 wherein the bath is either a chloride or sulfate based bath.

EXAMPLE 10

An electrodeposition bath for producing Permalloy containing 0.20 moles/liter $NiCl_2$, 0.0050 moles/liter $FeCl_2$, 0.70 moles/liter NaCl, 0.20 moles/liter $H_3BO_3$, and 0.0050 moles/liter to 10.0 moles/liter ethylenediamine or diethylenetriamine.

EXAMPLE 11

The bath of Example 10 further including adjusting the pH of the bath to about 5 using concentrated HCl or a 50% NaOH solution.

EXAMPLE 12

The electroplating bath of Example 11 further including a small amount of saccharin, sodium lauryl sulfate, and tartrate.

EXAMPLE 13

The electroplating bath of Example 10 further including adjusting the pH to about 4.0 to 6.5 with concentrated HCl or a 50% NaOH solution.

EXAMPLE 14

An improved electroplating bath for producing a nickel-iron thin film containing iron, nickel, sodium chloride, ethylenediamine, and having a pH of about 4.5 to 5.5.

EXAMPLE 15

The electroplating bath of Example 14 further containing tartaric acid and boric acid.

EXAMPLE 16

The electroplating bath of Example 14 containing diethylenetriamine in addition to or in place of ethylenediamine.

EXAMPLE 17

The electroplating bath of Example 14 containing an organic amine compound having at least two amine groups with no more than two carbons separating the amine groups in addition to or as a substitute for ethylenediamine.

EXAMPLE 18

An improved electroplating bath for producing nickel-iron thin films containing nickel, iron, chloride, boric acid, and about 0.025 to 0.60 moles/liter ethylenediamine.

EXAMPLE 19

The electroplating bath of Example 18 having a pH of about

EXAMPLE 20

The electroplating bath of Example 19 containing 0.010 moles/liter to 0.10 moles/liter diethylenetriamine (DETA) in place of ethylenediamine.

EXAMPLE 21

The electroplating bath of Example 18 or 20 further containing tartaric acid, boric acid, sodium chloride, saccharin, and/or sodium lauryl sulfate.

EXAMPLE 22

The electroplating bath of Example 21 wherein the pH is adjusted to about 5.

EXAMPLE 23

An improved electroplating bath containing 23.8 g $NiCl_2.6H_2O$, 0.4994 g $FeCl_2.4H_2O$, 20.45 g NaCl, 12.41 g $H_3BO_3$, and 0.76 g ethylenediamine (EDA) with the pH adjusted to about 5.0 using dilute HCl and diluted to volume using high purity water (HPW).

EXAMPLE 24

The bath of Example 23 containing 3.01 g ethylenediamine.

EXAMPLE 25

The bath of Example 23 containing about 12.11 g ethylenediamine.

EXAMPLE 26

The bath of Example 23 containing tartaric acid.

EXAMPLE 27

A nickel-iron thin film product containing about 22% iron and 78% nickel produced using the process or electroplating bath of one of Examples 2 through 26.

EXAMPLE 28

An improved computer hard disk drive head containing the nickel-iron thin film product of Example 27.

EXAMPLE 29

An improved temperature sensor containing the nickel-iron thin film product of Example 27.

EXAMPLE 30

An improved plating bath for forming a nickel-iron Permalloy thin film containing 30 to 150 g/l $NiCl_2.6H_2O$, 4.5 to 5.77 g/l $FeCL_2.4H_2O$, 12.5 to 25 g/l $H_3BO_3$, 0 to 2 g/l Na Saccharin, 0 to 0.2 g/l Na Lauryl Sulfate, 10 to 80 g/l tartrate, and 0.005 to 10 g/l ethylenediamine or diethylenetriamine with a pH of the bath of about 3.0 to 6.5, a current density of about 3 to 120 $mA/cm^2$ and a temperature of about 20 to 45° C.

TABLE I

Complex formation and acid dissociation constants for the complexants examined in this study (5).

| Complexant | Metal | log $K_1$ | log $\beta_2$ | log $\beta_3$ | pK's |
|---|---|---|---|---|---|
| Tartaric Acid | Ni(II) | (?) | (?) | | 3.0, 4.4 |
| | Fe(II) | (?) | (?) | | |
| | Fe(III) | 7.9 | | | |
| Glycine | Ni(II) | 6.2 | 11.1 | 15 | 2.4, 9.8 |
| | Fe(II) | 4.3 | 7.8 | | |
| | Fe(III) | 10.0 | | | |
| Ethylenediamine | Ni(II) | 7.5 | 13.8 | 18.3 | 6.8, 9.9 |
| | Fe(II) | 4.3 | 7.6 | 9.7 | |
| | Fe(III) | (?) | | | |

(?) indicates data not available

REFERENCES

1. H. Dahms and I. Croll, *J. Electrochem. Soc.,* Vol. 112, p. 771 (1965).

2. S. Hessami and C. Tobias, *J. Electrochem. Soc.,* Vol. 136, p. 3611 (1989).

3. A. Deligianni and L. Romankiw, in Magnetic Materials, Processes and Devices/1989, L. Romankiw and D. Herman, Jr., Editors, p. 407 and 423, *The Electrochemical Society,* Pennington, N.J. (1990).

4. A. Vaskelis, A. Jagminiene and A. Prokoptchik, *Surface and Coating Technology,* Vol. 27, p. 301 (1986).

5. J. Dean, Editor, *Lange's Handbook of Chemistry,* 14th Ed., p. 8.83, McGraw-Hill, N.Y. (1992).

Thus, it will be appreciated that as a result of the present invention, a highly effective improved electroplating bath for nickel-iron alloys and method is provided by which the principal objective, among others, is completely fulfilled. It is contemplated and will be apparent to those skilled in the art from the preceding description and accompanying drawings, that modifications and/or changes may be made in the illustrated or described embodiments without departure from the present invention. Accordingly, it is expressly intended that the foregoing description and accompanying drawings are illustrative of preferred embodiments only, not limiting, and that the true spirit and scope of the present invention be determined by reference to the appended claims.

What is claimed is:

1. In a method of manufacturing a computer hard disk drive head including electrodeposition of a nickel-iron thin film using an acid chloride based permalloy electroplating bath having a pH of at least about 5, the improvement comprising adding to the acid chloride based permalloy electroplating bath having a pH of at least about 5 ethylenediamine in an amount from 0.01 to 1.0 moles/liter.

2. The method as recited in claim 1, wherein the ethylenediamine is added in a sufficient quantity to produce a at least four fold increase in the nickel/iron mass ratio at low applied current densities.

3. The method as recited in claim 1, wherein the pH of the electroplating bath is adjusted to at least about 5 using at least one of concentrated HCl and a 50% NaOH solution.

4. The method as recited in claim 1, wherein ethylenediamine is added in an amount from at least 0.05 moles/liter.

5. The method as recited in claim 1, wherein said bath has a pH between 5.0 and 6.5.

6. The method as recited in claim 1, wherein said ethylenediamine is added in an amount sufficient to allow a higher concentration of ferrous ions to be present in the bath, which in turn provide for greater control of the electrodeposited thin film, which must be maintained precisely to minimize the deleterious effects of magnetostriction.

7. An improved acid chloride based electroplating bath for depositing a nickel-iron thin film, comprising about 0.20 moles/liter $NiCl_2$, 0.025 moles/liter $FeCl_2$ and 0.20 moles/liter ethylenediamine and having a pH of about 5 for increasing the nickel/iron mass ratio of the thin film deposit.

8. In a method of manufacturing a nickel-iron thin film, the improvement comprising electroplating the film using the bath as recited in claim 7.

9. In an acid chloride based permalloy electroplating bath having a pH of at least about 5, the improvement comprising the addition of a sufficient quantity of ethylenediamine to increase the nickel/iron mass ratio of a permalloy deposit.

10. The method as recited in claim 9, wherein the improvement further comprises the addition of a small amount of tartrate ions to the plating bath to prevent the precipitation of ferric hydroxide.

* * * * *